(12) United States Patent
Szczesny

(10) Patent No.: US 9,518,785 B2
(45) Date of Patent: Dec. 13, 2016

(54) RECEPTACLE ASSEMBLY FOR RECEIVING A PLUGGABLE MODULE

(71) Applicant: Tyco Electronics Corporation, Berwyn, PA (US)

(72) Inventor: David Stanley Szczesny, Hershey, PA (US)

(73) Assignee: TYCO ELECTRONICS CORPORATION, Berwyn, PA (US)

(*) Notice: Subject to any disclaimer, the term of this patent is extended or adjusted under 35 U.S.C. 154(b) by 286 days.

(21) Appl. No.: 13/949,990

(22) Filed: Jul. 24, 2013

(65) Prior Publication Data

US 2015/0029667 A1    Jan. 29, 2015

(51) Int. Cl.
    *H05K 7/20*    (2006.01)
    *F28D 15/02*   (2006.01)
    *G02B 6/42*    (2006.01)

(52) U.S. Cl.
    CPC ......... *F28D 15/0275* (2013.01); *G02B 6/4261* (2013.01); *G02B 6/4268* (2013.01); *G02B 6/4269* (2013.01)

(58) Field of Classification Search
    CPC .............. H05K 7/20409; H05K 7/2039; H05K 7/20336; H05K 7/4272; F28D 15/0275; H04B 1/036; G02B 6/4269; G02B 6/4268; G02B 6/4261
    USPC ....... 361/704, 709, 700, 719, 715, 690, 688, 361/720, 711, 710, 409, 716
    See application file for complete search history.

(56) References Cited

U.S. PATENT DOCUMENTS

| | | | |
|---|---|---|---|
| 7,764,504 B2 * | 7/2010 | Phillips ................ | G02B 6/4246 165/80.2 |
| 8,861,203 B2 * | 10/2014 | Fang ........................ | G06F 1/20 165/185 |
| 8,864,523 B2 * | 10/2014 | Banakis et al. .......... | 439/607.25 |
| 2006/0060328 A1 * | 3/2006 | Ewes et al. ................... | 165/80.2 |
| 2008/0019100 A1 * | 1/2008 | Yang .................... | H05K 9/0058 361/716 |
| 2008/0285236 A1 * | 11/2008 | Phillips et al. ............... | 361/709 |
| 2012/0058670 A1 * | 3/2012 | Regnier ........... | H01R 13/65802 439/485 |
| 2012/0099275 A1 * | 4/2012 | Regnier ........................ | 361/690 |

* cited by examiner

Primary Examiner — Stephen Sul

(57) ABSTRACT

A receptacle assembly includes a cage having an interior cavity and a divider that divides the interior cavity into first and second ports. The cage has a front end that is open to the first and second ports, which are configured to receive first and second pluggable modules, respectively, therein through the front end. The divider includes an internal compartment that extends between the first and second ports. The receptacle assembly includes a thermal transfer assembly having a base and a spring. The base is received within the internal compartment of the divider and includes a module side that faces the first port. The spring is operatively connected between the divider and the base such that the spring is configured to bias the base toward the first port and thereby press the module side of the base into thermal communication with the first pluggable module.

19 Claims, 8 Drawing Sheets

RECEPTACLE ASSEMBLY FOR RECEIVING A PLUGGABLE MODULE

BACKGROUND OF THE INVENTION

The subject matter described and/or illustrated herein relates generally to pluggable modules, and more particularly to receptacle assemblies for receiving pluggable modules.

Various types of fiber optic and copper based transceiver assemblies that permit communication between host equipment and external devices are known. The transceiver assemblies typically include one or more pluggable modules received within a receptacle assembly, which includes one or more receptacle connectors that pluggably connect to the pluggable module(s). The receptacle assembly typically includes a metal cage having one or more ports that receive the pluggable module(s) therein. The receptacle connector(s) is held in the internal compartment of the cage for connection with the pluggable module(s) as the pluggable module(s) is inserted therein.

Due to increases in the density, power output levels, and/or switching speeds of some pluggable modules, there may be a corresponding increase in heat generated by the pluggable module. The heat generated by the operation of the pluggable modules can lead to significant problems. For example, some pluggable modules may lose performance, or outright fail, if the core temperature of the module rises too high. Known techniques used to control the temperature of pluggable modules include mounting a heat sink to the cage. When the pluggable module is received within the receptacle assembly, the heat sink thermally communicates (e.g., engages in physical contact) with the pluggable module to dissipate heat from the module. But, some cages include two or more ports arranged in one or more columns and/or rows. The heat sink may only thermally communicate with some of the ports, and therefore may only thermally communicate with some of the pluggable modules, which may cause one or more other pluggable modules received within the cage to overheat. For example, when a cage includes upper and lower ports arranged in a vertical column, the heat sink may be mounted along a top side of the cage for thermal communication with the pluggable module received within the upper port. But, the heat sink does not thermally communicate with the pluggable module that is received within the lower port, which may cause the pluggable module within the lower port to overheat.

BRIEF DESCRIPTION OF THE INVENTION

In an embodiment, a receptacle assembly includes a cage having an interior cavity and a divider that divides the interior cavity into first and second ports. The cage has a front end that is open to the first and second ports. The first and second ports are configured to receive first and second pluggable modules, respectively, therein through the front end. The divider includes an internal compartment that extends between the first and second ports. The receptacle assembly includes a thermal transfer assembly that includes a base and a spring. The base is received within the internal compartment of the divider and includes a module side that faces the first port. The spring is operatively connected between the divider and the base such that the spring is configured to bias the base toward the first port and thereby press the module side of the base into thermal communication with the first pluggable module when the first pluggable module is received within the first port.

In an embodiment, a receptacle assembly is provided for mating with first and second pluggable modules. The receptacle assembly includes a cage having an interior cavity and a divider that divides the interior cavity into first and second ports. The cage includes a front end that is open to the first and second ports. The first and second ports are configured to receive the first and second pluggable modules, respectively, therein through the front end. The divider includes an internal compartment that extends between the first and second ports. First and second receptacle connectors are held within the first and second ports, respectively, for mating with the first and second pluggable modules, respectively. The receptacle assembly includes a thermal transfer assembly having a base, a spring, and a heat pipe. The base is received within the internal compartment of the divider and includes a module side that faces the first port. The spring is operatively connected between the divider and the base such that the spring is configured to bias the base toward the first port and thereby press the module side of the base into thermal communication with the first pluggable module when the first pluggable module is received within the first port. The heat pipe includes a base segment that is connected in thermal communication with the base. The heat pipe includes a transfer segment that extends away from the base segment for carrying heat away from the base.

In an embodiment, a cage assembly includes a cage having an interior cavity and a divider that divides the interior cavity into at least two ports. The cage has a front end that is open to the ports. The divider includes an internal compartment. The cage assembly includes a thermal transfer assembly having a base, a spring, and a heat pipe. The base is received within the internal compartment of the divider and includes a module side. The spring is operatively connected between the divider and the base such that the spring is configured to bias the base toward a corresponding one of the ports and thereby press the module side of the base into thermal communication with a pluggable module when the pluggable module is received within the corresponding port. The heat pipe includes a base segment that is connected in thermal communication with the base. The heat pipe includes a transfer segment that extends away from the base segment for carrying heat away from the base.

DETAILED DESCRIPTION OF THE INVENTION

Figure 1:
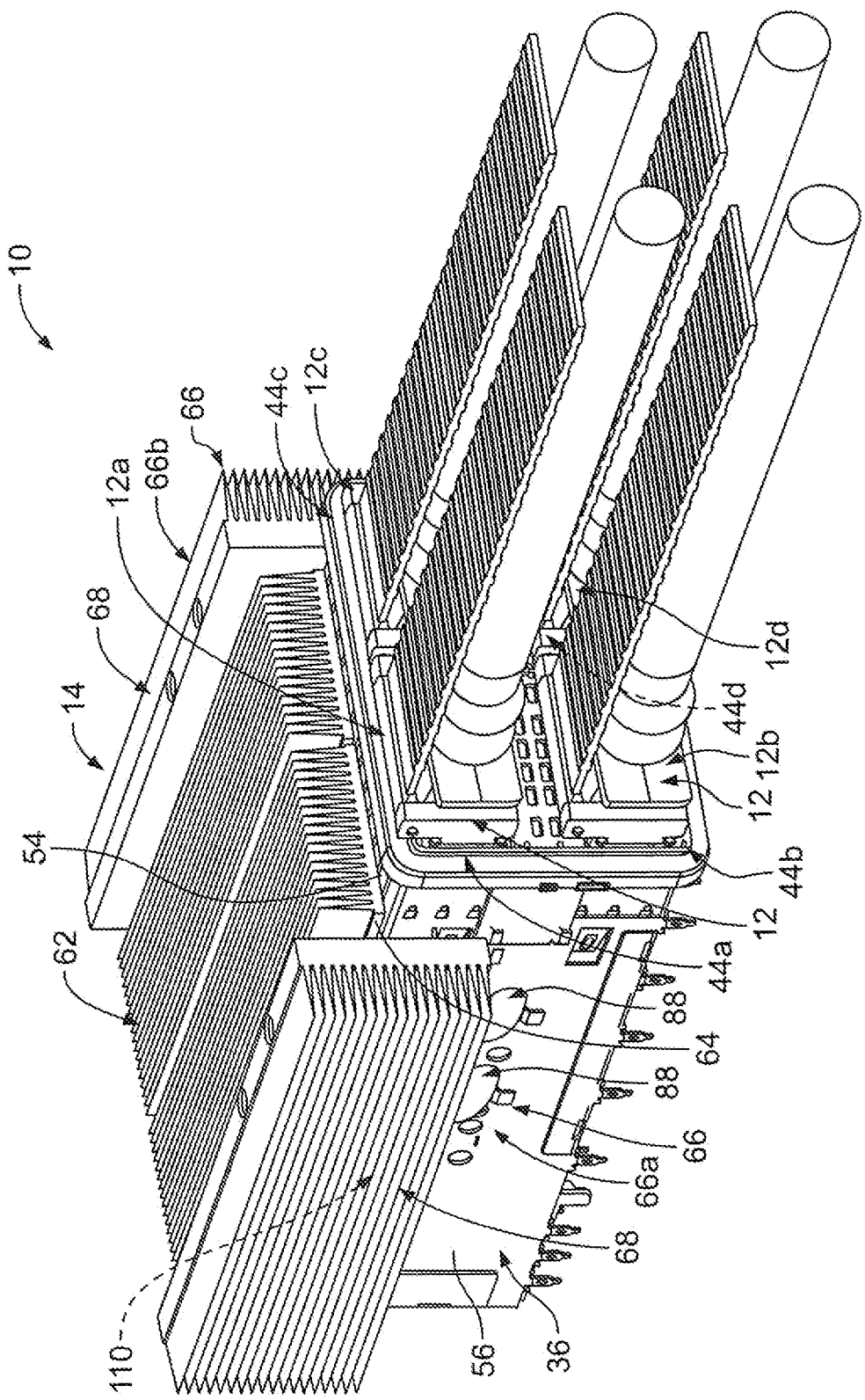
FIG. 1 is a perspective view of an embodiment of a transceiver assembly.

FIG. 1 is a perspective view of an embodiment of a transceiver assembly 10. In the illustrated embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 28 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or the exemplary type of transceiver assembly shown and described herein.

The transceiver assembly 10 includes one or more pluggable modules 12 configured for pluggable insertion into a receptacle assembly 14 that is mounted on a host circuit board (not shown). The host circuit board may be mounted in a host system (not shown) such as, but not limited to, a router, a server, a computer, and/or the like. The host system typically includes a conductive chassis (not shown) having a panel (not shown) including one or more openings (not shown) extending therethrough in substantial alignment with the receptacle assembly 14. The receptacle assembly 14 is optionally electrically connected to the panel.

Figure 2:
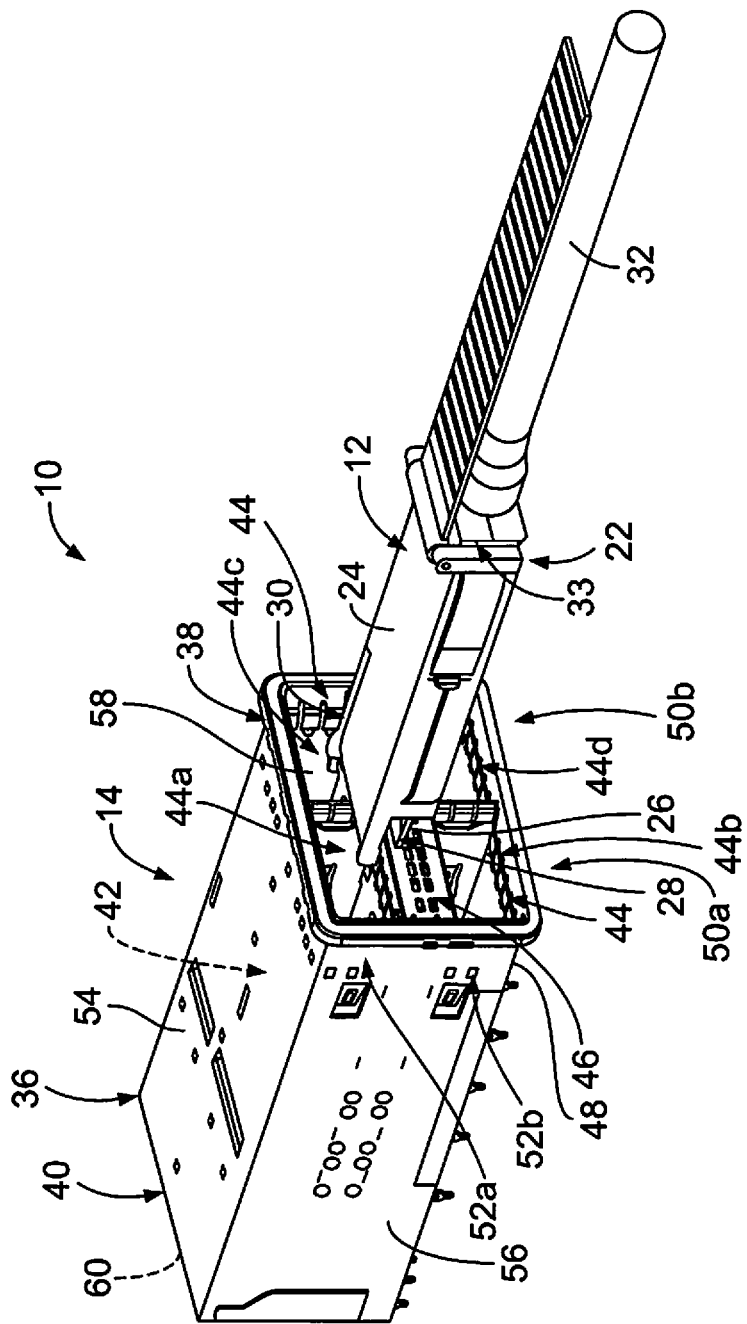
FIG. 2 is a partially exploded view of a portion of the transceiver assembly shown in FIG. 1.

FIG. 2 is a partially exploded view of a portion of the transceiver assembly 10. Only some components of the receptacle assembly 14 are shown in FIG. 2. Moreover, only one pluggable module 12 is shown in FIG. 2 for clarity. The pluggable module 12 is configured to be inserted into the receptacle assembly 14. Specifically, the pluggable module 12 is inserted into the receptacle assembly 14 through the panel opening such that a front end 22 of the pluggable module 12 extends outwardly from the receptacle assembly 14. The pluggable module 12 includes a housing 24 that forms a protective shell for a circuit board 26 that is disposed within the housing 24. The circuit board 26 carries circuitry, traces, paths, devices, and/or the like that perform transceiver functions in a known manner. An edge 28 of the circuit board 26 is exposed at a rear end 30 of the housing 24 for pluggable insertion into a receptacle connector (not shown) of the receptacle assembly 14. In an alternative embodiment, a straddle mount connector (not shown) is mounted to the circuit board 26 and exposed at the rear end 30 of the housing 24 for plugging into the receptacle connector.

Each pluggable module 12 interfaces to one or more optical and/or electrical cables 32 through a connector interface 33 at the front end 22 of the module 12. Suitable connector interfaces 33 are known and include, but are not limited to, adapters for the LC style fiber connectors and the MTP/MPO style fiber connectors offered by TE Connectivity (Harrisburg, Pa.).

In general, the pluggable modules 12 and the receptacle assembly 14 may be used in any application requiring an interface between a host system and electrical and/or optical signals. Each pluggable module 12 interfaces to the host system through the receptacle assembly 14 via a corresponding receptacle connector 34 (FIG. 3) of the receptacle assembly 14. The receptacle connector(s) 34 is located within an electrically conductive cage 36 (which is sometimes referred to as a "receptacle guide frame" or a "guide frame") of the receptacle assembly 14. As illustrated in FIG. 2, the cage 36 extends from a front end 38 to a rear end 40 that is opposite the front end 38. The cage 36 includes an interior cavity 42 that is divided into two or more ports 44 by one or more dividers 46. The front end 38 of the cage 36 is open to the ports 44. The front end 38 of the cage 36 is configured to be mounted, or received, within the opening in the panel. The receptacle connector(s) 34 (FIG. 3) extend within each port 44 at the rear end 40 of the cage 36. The cage 36 is configured to be mounted to the host circuit board (not shown) along a lower wall 48 of the cage 36. The cage 36 includes one or more openings (not shown) that extend through the lower wall 48 for enabling the receptacle connector(s) 34 to electrically connect to the host circuit board from within the corresponding port 44. Each port 44 of the cage 36 is configured to receive the corresponding pluggable module 12 therein in electrical connection with the corresponding receptacle connector 34.

Although the cage 36 is shown as including four ports 44 in the illustrated embodiment, the cage 36 may include any number of ports 44 that is equal to or greater than two ports 44. The ports 44 of the cage 36 may be arranged in any pattern, configuration, arrangement, and/or the like (such as, but not limited to, any number of rows and/or columns). In the illustrated embodiment, the receptacle assembly 14 includes four ports 44 that are arranged in two columns 50a and 50b and two rows 52a and 52b. The columns 50a and 50b extend vertically (i.e., approximately perpendicular) relative to the plane of the host circuit board, while the rows 52a and 52b extend horizontally (i.e., approximately parallel) to the plane of the host circuit board. The column 50a includes an upper port 44a and a lower port 44b, with the lower port 44b being arranged below the upper port 44a in the column 50a such that the lower port 44b extends between the host circuit board and the upper port 44a. Similarly, the column 50b includes an upper port 44c and a lower port 44d, with the lower port 44d being arranged below the upper port 44c in the column 50b such that the lower port 44d extends between the host circuit board and the upper port 44c. One example of another pattern, configuration, arrangement, and/or the like of the ports 44 includes two ports arranged in a single column 50. Another example of another pattern, configuration, arrangement, and/or the like of the ports 44 includes two ports arranged in a single row 52a or 52b. Each of the ports 44a, 44b, 44c, and 44d may be referred to herein as a "first port" and/or a "second port".

In the illustrated embodiment, the cage 36 includes an upper wall 54, the lower wall 48, and opposite side walls 56 and 58 that extend from the upper wall 54 to the lower wall 48. The cage 36 may also include a rear wall 60, which is not visible in FIG. 2. The walls 48, 54, 56, 58, and 60 define boundaries of the interior cavity 42 of the cage 36. It should be understood that in other embodiments, the cage 36 may be mounted to the host circuit board along the side wall 56 or along the side wall 58. In such other embodiments, each of the side walls 56 and 58 may be considered an upper wall or a lower wall, the upper wall 54 may be considered a side wall, and the lower wall 48 may be considered a side wall. Moreover, in such other embodiments, the ports 44a and 44b may define lower ports and the ports 44c and 44d may define upper ports, or vice versa. Although the cage 36 has the general shape of a parallelepiped in the illustrated embodiment, the cage 36 may additionally or alternatively include any other shape.

Referring again to FIG. 1, the receptacle assembly 14 includes a heat sink 62 for dissipating heat from pluggable modules 12a and 12c that are received within the ports 44a and 44c, respectively, of the cage 36. The heat sink 62 is mounted to the upper wall 54 of the cage 36 such that a base 64 of the heat sink 62 is in thermal communication with the pluggable modules 12a and 12c. The base 64 of the heat sink 62 may thermally communicate with the pluggable modules 12a and 12c by engaging in physical contact with the pluggable modules 12a and 12c (and/or with one or more thermal interface members, not shown, that extend between the base 64 and the pluggable modules 12a and 12c), for example through one or more openings (not shown) that extend through the upper wall 54 of the cage 36. In addition or alternatively, the base 64 of the heat sink 62 may thermally communicate with the pluggable modules 12a and 12c via the upper wall 54 of the cage 36. For example, the base 64 of the heat sink 62 may engage in physical contact with the upper wall 54 such that the base 64 absorbs heat from the upper wall 54 that has been absorbed from the pluggable modules 12a and 12c by the upper wall 54. Each of the pluggable modules 12a, 12b, 12c, and 12d may be referred to herein as a "first pluggable module" and/or a "second pluggable module".

As will be described in more detail below, the receptacle assembly 14 includes one or more thermal transfer assemblies 66 for dissipating heat from pluggable modules 12b and 12d that are received within the ports 44b and 44d, respectively, of the cage 36. As shown in FIG. 1, the thermal transfer assemblies 66 include optional heat sinks 68 in the illustrated embodiment.

Figure 3:
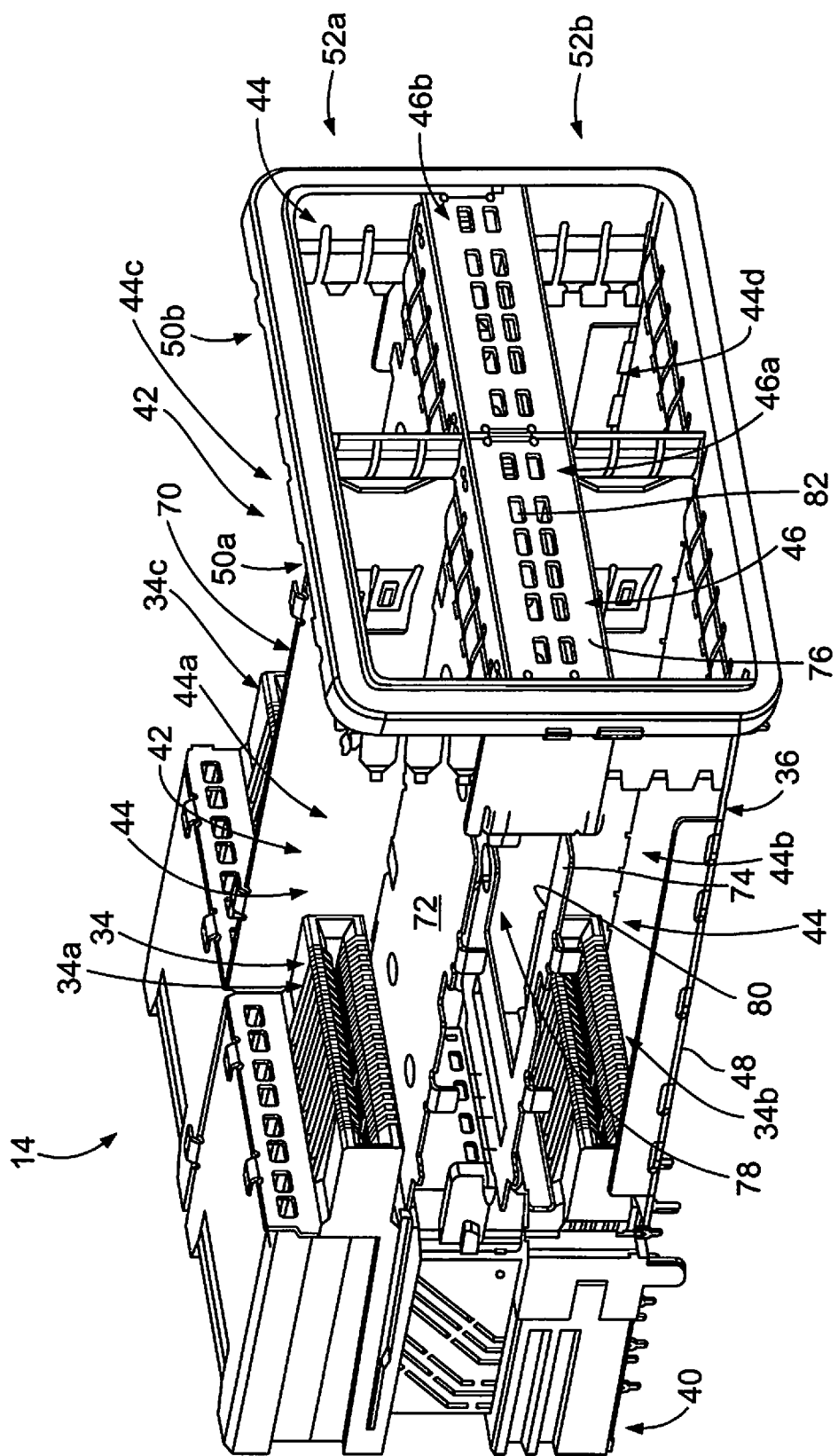
FIG. 3 is a partially broken-away perspective view of a portion of an embodiment of a receptacle assembly of the transceiver assembly shown in FIGS. 1 and 2.

FIG. 3 is a partially broken-away perspective view of a portion of an embodiment of the receptacle assembly 14. The upper wall 54 (FIG. 2) and the side walls 56 (FIGS. 1, 2, and 8) and 58 (FIG. 2) of the cage 36 have been removed from FIG. 3 to better illustrate the interior cavity 42 of the cage 36. The cage 36 includes a central wall 70 that divides the interior cavity 42 of the cage 36 into the columns 50a and 50b of the ports 44. The central wall 70 may be a single wall that extends from the upper wall 54 to the lower wall 48 of the cage 36. Alternatively, the central wall 70 may be defined by two walls, with one of the walls dividing the row 52a into the ports 44a and 44c and the other wall dividing the row 52b into the ports 44b and 44d.

The cage 36 includes one or more of the dividers 46 that divide the interior cavity 42 of the cage 36 into the ports 44a, 44b, 44c, and 44d. In the illustrated embodiment, the cage 36 includes two dividers 46a and 46b. The divider 46a extends from the side wall 56 to the central wall 70 and divides the column 50a into the ports 44a and 44b. The divider 46b extends from the side wall 58 to the central wall 70 and divides the column 50b into the ports 44c and 44d. In some alternative embodiments, the cage 36 includes a single divider 46 that extends from the side wall 56 to the side wall 58.

Figure 7:
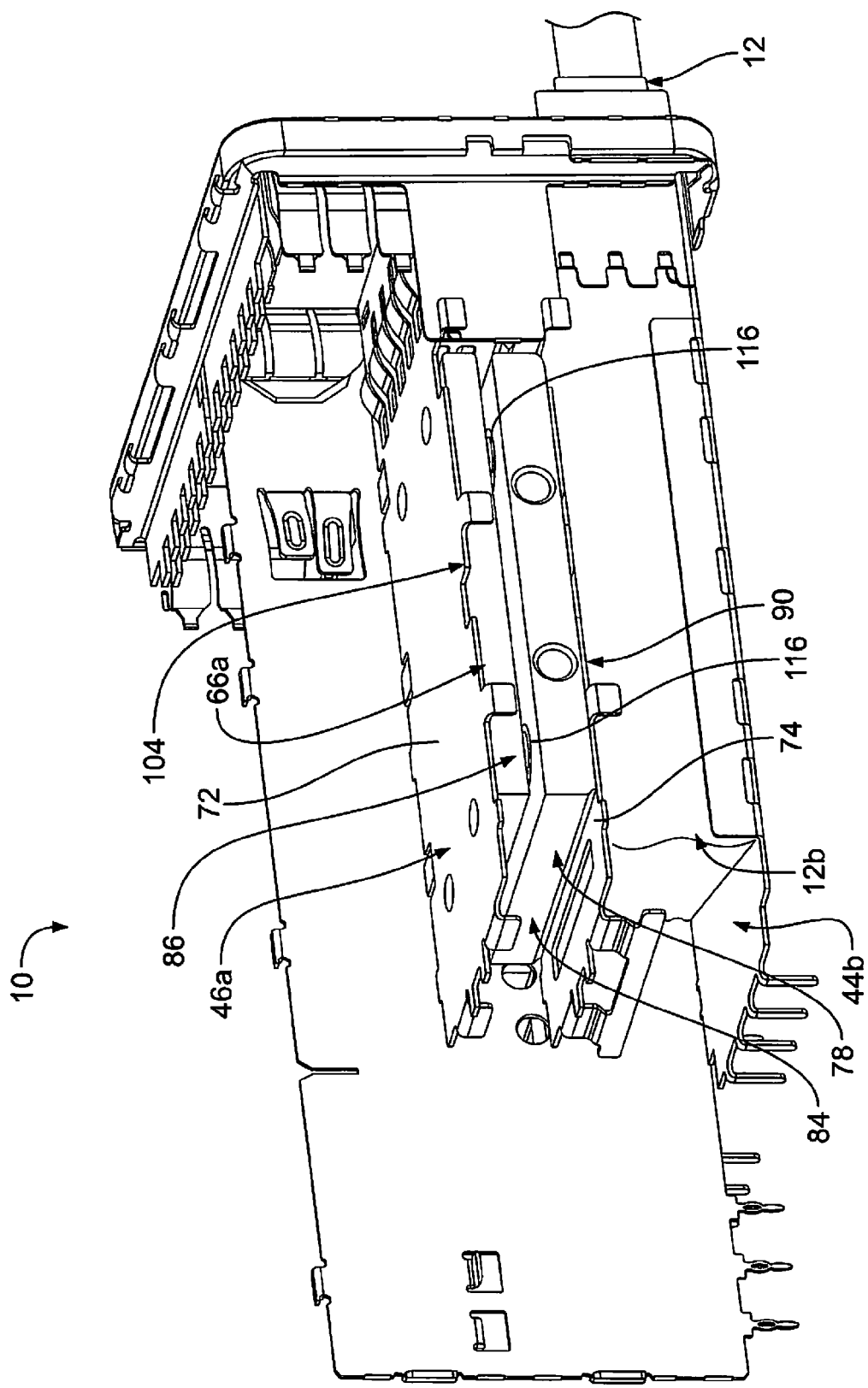
FIG. 7 is a partially broken-away perspective view of a portion of the transceiver assembly shown in FIGS. 1 and 2.

The divider 46a includes an upper wall 72, a lower wall 74, and a front wall 76 that extends from the upper wall 72 to the lower wall 74 at the front end 38 of the cage 36. The walls 72 and 74 are spaced apart from each other to define an internal compartment 78 of the divider 46a therebetween. As can be seen in FIG. 3, the internal compartment 78 of the divider 46a extends between the ports 44a and 44b. The upper wall 72 defines a boundary of the port 44a and defines a division between the port 44a and the internal compartment 78 of the divider 46a. The lower wall 74 defines a boundary of the port 44b and defines a division between the port 44b and the internal compartment 78 of the divider 46a. The side wall 56 of the cage 36 defines a boundary of the internal compartment 78, while the central wall 70 defines an opposite boundary of the internal compartment 78. Optionally, the lower wall 74 of the divider 46a includes an opening 80 that extends through the lower wall 74. As will be described below, the opening 80 facilitates thermal communication between one of the thermal transfer assemblies 66a and the pluggable module 12b (FIGS. 1 and 7).

It should be understood that in other embodiments wherein the cage 36 is mounted to the host circuit board along the side wall 56 or along the side wall 58, the walls 72 and 74 of the divider 46a may be considered side walls of the divider 46a. Each of the upper wall 72 and the lower wall 74 may be referred to herein as a "first wall" and/or a "second wall".

As will be described in more detail below, the internal compartment 78 of the divider 46a is configured to hold a portion of the thermal transfer assembly 66a (FIGS. 1 and 4-8). The internal compartment 78 is optionally configured to hold one or more other components, such as, but not limited to, an electrical component, an optical component, an indicator light, a status light, and/or the like. Optionally, the front wall 76 includes one or more windows 82 for exposing one or more of the components held within the internal compartment 78, for example for enabling an indicator and/or status light to be visible through the front wall 76.

The structure and geometry of the divider 46b is substantially similar to the divider 46a and therefore the structure and geometry of the divider 46b will not be described in more detail herein.

As illustrated in FIG. 3, the receptacle connectors 34 extend within each port 44 at the rear end 40 of the cage 36. Specifically, the ports 44a and 44b include respective receptacle connectors 34a and 34b that are held therein at the rear end 40 of the cage 36. Similarly, the port 44c includes a receptacle connector 34c held therein. Although not visible in FIG. 3, the port 44d also includes a receptacle connector 34 held therein at the rear end 40 of the cage 36. The receptacle connectors 34a and 34b may be discrete components from each other or may be mechanically and/or electrically connected together (e.g., contained within the same housing, defining continuous electrical pathways therethrough, and/or the like). Similarly, the receptacle connector 34c and the receptacle connector 34 of the port 44d may be discrete components from each other or may be mechanically and/or electrically connected together (e.g., contained within the same housing, defining continuous electrical pathways therethrough, and/or the like).

Figure 4:
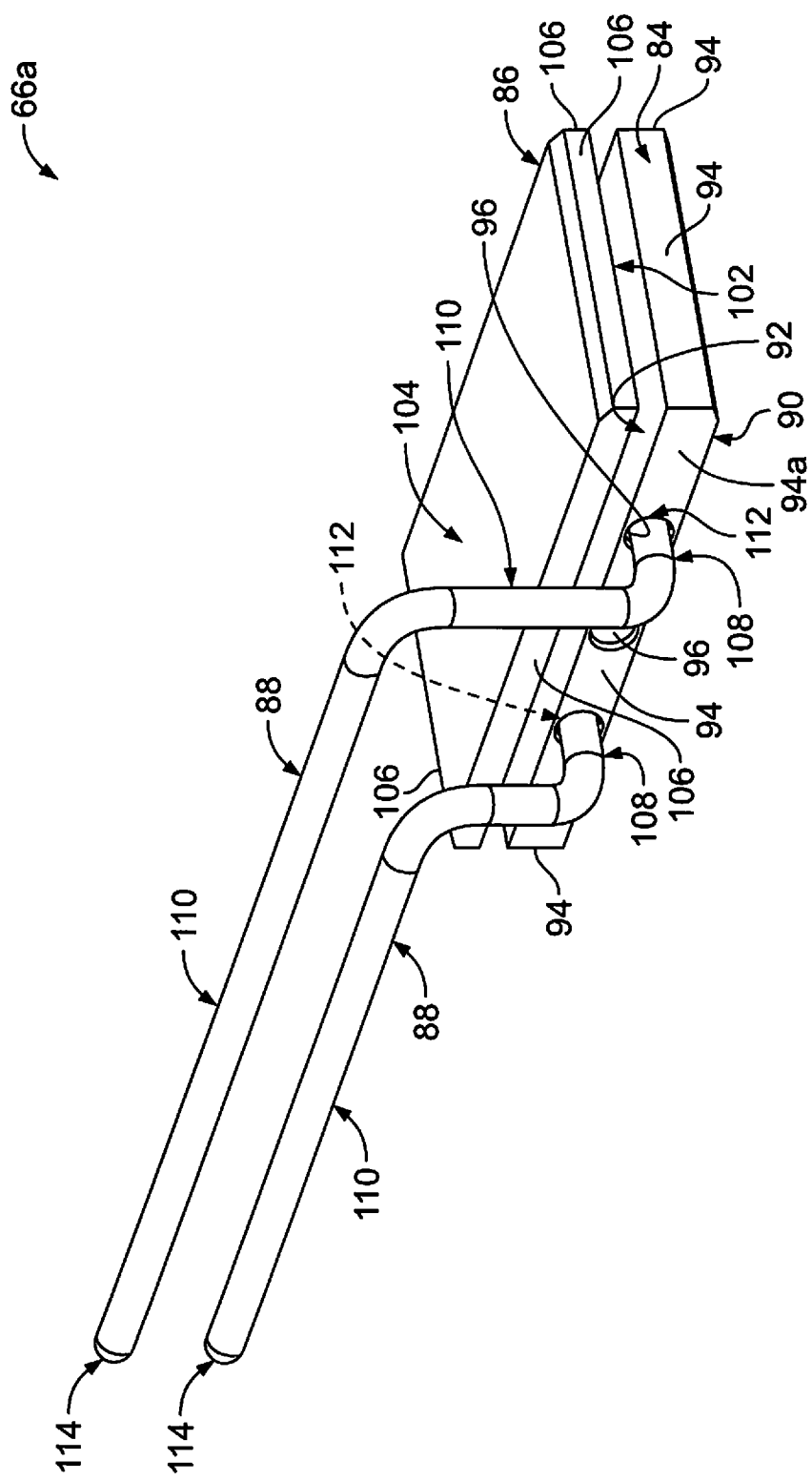
FIG. 4 is a perspective view of an embodiment of a thermal transfer assembly of the receptacle assembly shown in FIG. 3.
Figure 5:
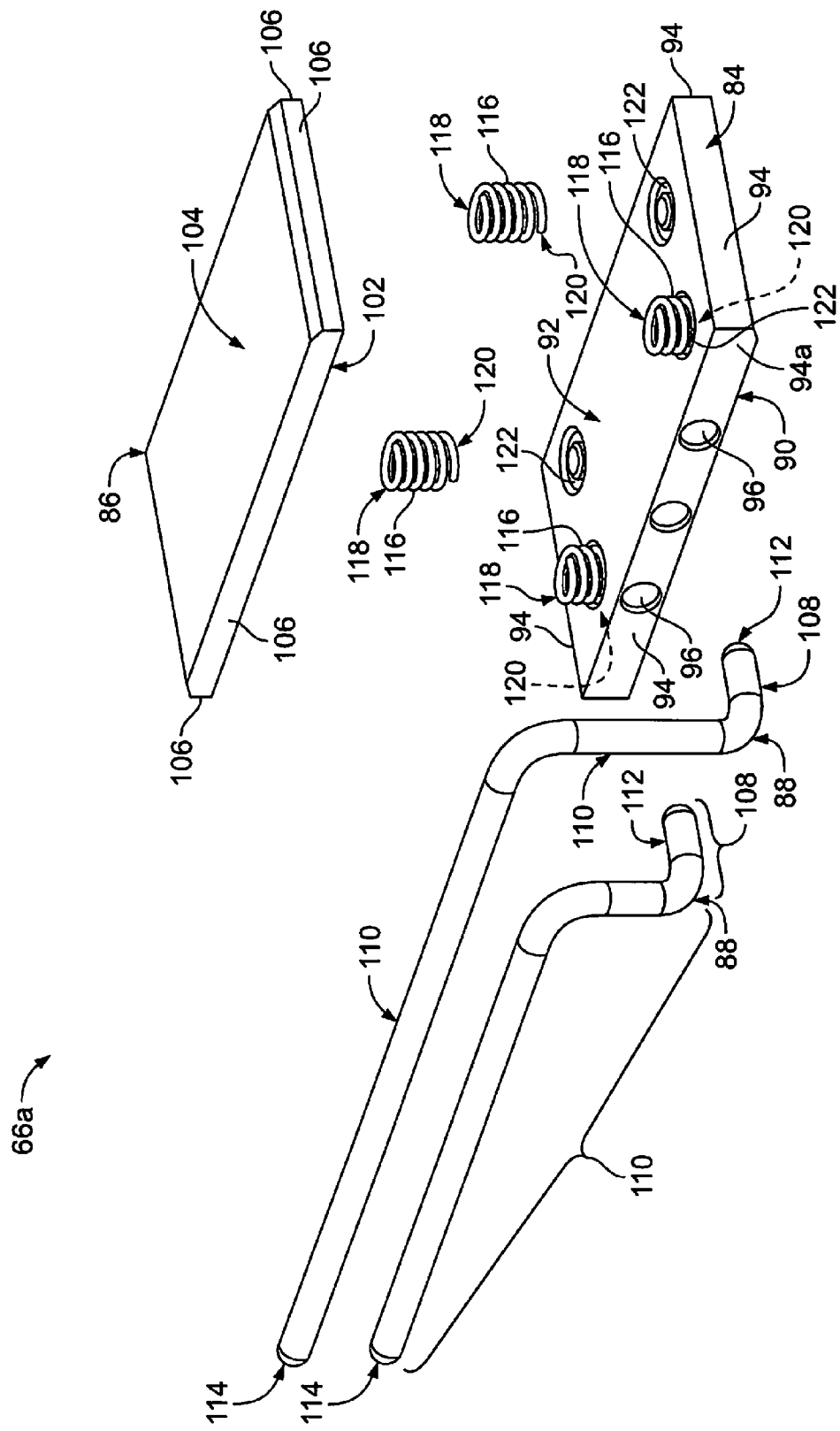
FIG. 5 is an exploded perspective view of the thermal transfer assembly shown in FIG. 4.
Figure 6:
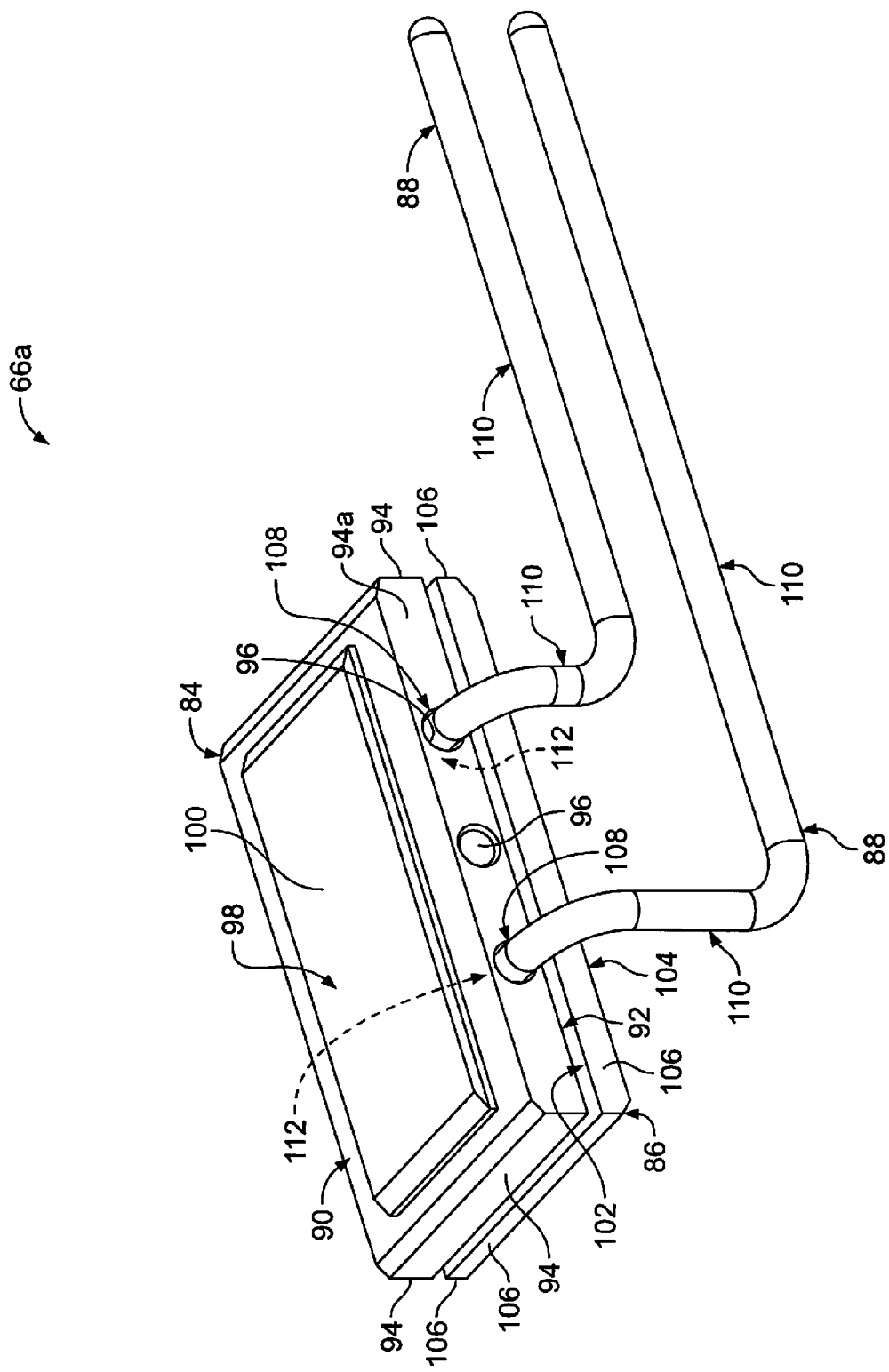
FIG. 6 is a perspective view of the thermal transfer assembly shown in FIGS. 4 and 5 viewed from a different orientation as compared to FIG. 4.

FIG. 4 is a perspective view of an embodiment of the thermal transfer assembly 66a. FIG. 5 is an exploded perspective view of the thermal transfer assembly 66a. FIG. 6 is another perspective view of the thermal transfer assembly 66a viewed from a different orientation as compared to FIG. 4. Referring now to FIGS. 4-6, the thermal transfer assembly 66a includes a base 84, a top 86, and one or more optional heat pipes 88. The base 84 includes a module side 90, a spring side 92 that extends opposite the module side 90, and one or more edges 94 that extend from the module side 90 to the spring side 92. As shown in FIGS. 4-6, the spring side 92 of the base 84 faces the top 86.

The base 84 includes one or more optional openings 96 that extend into an edge 94a of the base 84. Each opening 96 is configured to receive one or more corresponding heat pipes 88 therein to connect the heat pipe(s) 88 in thermal communication with the base 84. Although three are shown, the base 84 may include any number of openings 96 for receiving any number of the heat pipes 88. In the illustrated embodiment, each of the openings 96 has a cylindrical shape. But, each opening 96 may additionally or alternatively include any other shape. Although the base 84 has the general shape of a parallelepiped in the illustrated embodiment, the base 84 may additionally or alternatively include any other shape.

As will be described below and illustrated in FIG. 7, the module side 90 of the base 84 faces the port 44*b* (FIGS. 1-3 and 7) when the base 84 is held within the internal compartment 78 (FIGS. 3 and 7) of the divider 46*a* (FIGS. 2, 3, and 7) for thermally communicating with the pluggable module 12*b* (FIGS. 1 and 7). Referring now solely to FIG. 6, the module side 90 of the base 84 includes an optional platform 98 that extends outward along the module side 90. The platform 98 includes a module surface 100 at which the base 84 is configured to thermally communicate with the pluggable module 12*b*. As will be described below, the platform 98 is configured to extend within the opening 80 (FIG. 3) of the lower wall 74 (FIGS. 3 and 7) of the divider 46*a* to facilitate connecting the module surface 100 in thermal communication with the pluggable module 12*b*.

Referring again to FIGS. 4-6, the top 86 includes a base side 102, an upper wall side 104 that extends opposite the base side 102, and one or more edges 106 that extend from the base side 102 to the upper wall side 104. As shown in FIGS. 4-6, the base side 102 of the top 86 faces the base 84. As will be described below and illustrated in FIG. 7, the top 86 is configured to extend within internal compartment 78 of the divider 46*a* between the base 84 and the upper wall 72 (FIGS. 3 and 7) of the divider 46. When the top 86 is held within the internal compartment 78, the upper wall side 104 of the top 86 faces and engages in physical contact with the upper wall 72 of the divider 46*a*, as will be described below. Although the top 86 has the general shape of a parallelepiped in the illustrated embodiment, the top 86 may additionally or alternatively include any other shape.

In the illustrated embodiment, the thermal transfer assembly 66*a* includes two heat pipes 88. But, the thermal transfer assembly 66*a* may include any number of heat pipes 88. Each heat pipe 88 may be any type of heat pipe, such as, but not limited to, fluid filled heat pipes, vacuum heat pipes, solid heat pipes, and/or the like.

Each heat pipe 88 includes a base segment 108 and a transfer segment 110 that extends away from the base segment 108. The base segment 108 is connected in thermal communication with the base 84. Specifically, an end 112 of the base segment 108 of each heat pipe 88 is received within the corresponding opening 96 of the base 84 such that the end 112 of the base segment 108 is connected in thermal communication with the base 84. For example, the ends 112 may be connected in thermal communication with base 84 by engaging in physical contact with interior walls that define the openings 96 of the base 84 and/or with one or more thermal interface members (not shown) that extend between the interior walls of the base 84 and the ends 112. In alternative to extending within the corresponding opening 96, the end 112 of the base segment 108 of one or more of the heat pipes 88 may engage in physical contact with the edge 94*a* (and/or with a thermal interface member, not shown, that extends between the edge 94*a* and the end 112) to connect the end 112 in thermal communication with the base 84.

The ends 112 of the base segments 108 of the heat pipes 88 may be held within the corresponding openings 96 using any structure, means, connection type, and/or the like, such as, but not limited to, an interference-fit, a snap-fit, using an adhesive, using a fastener, and/or the like.

When the ends 112 of the heat pipes 88 are received within the corresponding openings 96 as shown in FIGS. 4 and 6, the base segment 108 of each heat pipe 88 extends outward from the edge 94*a* of the base 84. The transfer segment 110 of each heat pipe 88 extends away from the base segment 108 and away from the edge 94*a* of the base 84 for carrying heat away from the base 84. The path of each heat pipe 88 from the end 112 of the base segment 108 to an end 114 of the transfer segment 110 is not limited to the path shown herein. Rather, the path of each heat pipe 88 from the end 112 of the base segment 108 to an end 114 of the transfer segment 110 may additionally or alternatively include any other shape that enables the heat pipe 88 to carry heat away from the base 84.

Referring now solely to FIG. 5, the thermal transfer assembly 66*a* includes one or more springs 116. In the illustrated embodiment, the thermal transfer assembly 66*a* includes four springs 116. But, the thermal transfer assembly 66*a* may include any number of the springs 116. When the base 84, the top 86, and the springs 116 are held within the internal compartment 78 of the divider 46*a*, each spring 116 is in a compressed state and is operatively connected between the divider 46*a* and the base 84 such that the spring 116 is configured to bias the base 84 toward the port 44*b*. Specifically, in the illustrated embodiment, an end 118 of each spring 116 is engaged in physical contact with the base side 102 of the top 84, while an opposite end 120 of each spring 116 is engaged in physical contact with the spring side 92 of the base 84. Each spring 116 is thereby engaged in physical contact between the top 86 and the base 84 such that during compression the spring 116 is configured to bias the base 84 away from the top 86, and thereby toward the port 44*b*.

In the illustrated embodiment, the ends 120 of the springs 116 are seated in corresponding optional spring seats 122 that extend into the spring side 92 of the base 84. Optionally, the opposite ends 118 of the springs 116 are seated in corresponding spring seats (not shown) that extend into the base side 102 of the top 86. Although illustrated as helical springs, each spring 116 may additionally or alternatively be any other type of spring (having any arrangement relative to the base 84 and top 86) that enables the spring 116 to bias the base 84 toward the port 44*b*.

FIG. 7 is a partially broken-away perspective view of a portion of the transceiver assembly 10. FIG. 7 illustrates the assembly of the base 84, the top 86, and the springs 116 of the thermal transfer assembly 66*a* as held within the internal compartment 78 of the divider 46*a*. A portion of the pluggable module 12*b* is shown in FIG. 7 as received within the port 44*b*.

As shown in FIG. 7, the top 86 extends within the internal compartment 78 of the divider 46*a* between the base 84 and the upper wall 72 of the divider 46. The upper wall side 104 of the top 86 faces and engages in physical contact with the upper wall 72 of the divider 46*a*. The module side 90 of the base 84 faces the port 44*b* for thermally communicating with the pluggable module 12*b*. The springs 116 are engaged in physical contact between the base 84 and the top 86 such that the springs 116 bias the base 84 away from the top 86 and toward the port 44*b*. The springs 116 thereby press the module side 90 of the base 84 into thermal communication with the pluggable module 12*b*. The base 84 absorbs heat from the pluggable module 12*b* via the thermal communication between the module side 90 of the base 84 and the pluggable module 12*b*

The module side 90 of the base 84 may thermally communicate with the pluggable module 12*b* by engaging in physical contact with the pluggable module 12*b*. For example, the springs 116 may press the module side 90 of the base 84 into the opening 80 (FIG. 3) of the lower wall 74 of the divider 46a such that the module surface 100 (FIG. 6) of the platform 98 (FIG. 6) engages in physical contact with the pluggable module 12b. In addition or alternatively to engaging in physical contact with the pluggable module 12b, the springs 116 may press the module side 90 of the base 84 into the opening 80 of the lower wall 74 of the divider 46a such that the module surface 100 of the platform 98 engages in physical contact with one or more thermal interface members (not shown) that extend between the module surface 100 and the pluggable module 12b. In addition or alternatively to engaging in physical contact with the pluggable module 12b and/or the thermal interface member, the module side 90 of the base 84 may thermally communicate with the pluggable module 12b via engagement in physical contact with the lower wall 74 of the divider 46a. For example, the module side 90 of the base 84 may engage in physical contact with the lower wall 74 such that the base 84 absorbs heat from the lower wall 74 that has been absorbed from the pluggable module 12b by the lower wall 74.

Figure 8:
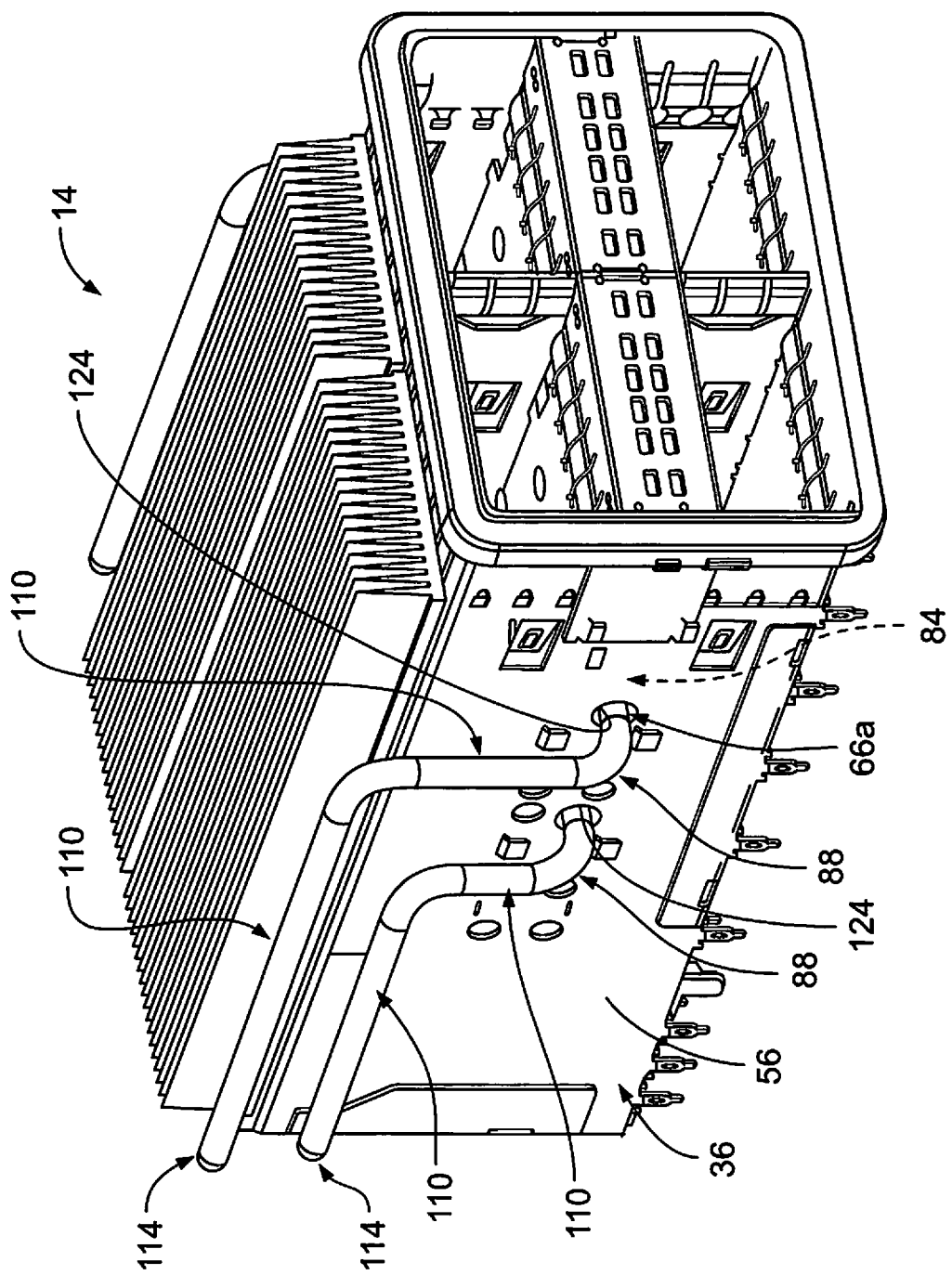
FIG. 8 is a perspective view of the receptacle assembly shown in FIG. 3.

FIG. 8 is a perspective view of the receptacle assembly 14 illustrating the thermal transfer assembly 66a held by the cage 36. Each heat pipe 88 of the thermal transfer assembly 66a extends outward from the base 84 through a corresponding opening 124 of the side wall 56 of the cage 36. The transfer segment 110 of each heat pipe 88 extends along the side wall 56 of the cage 36 and away from the base 84 such that the heat pipes 88 carry heat away from the base 84. The thermal transfer assembly 66a is thus configured to dissipate heat from the pluggable module 12b (FIGS. 1 and 7) by absorbing heat from the pluggable module 12b at the base 84 and carrying the heat absorbed by the base 84 along the heat pipes 88 away from the base 84.

The path of each heat pipe 88 from the base 84 to the end 114 of the transfer segment 110 is not limited to the path shown herein. Rather, the path of each heat pipe 88 from the base 84 to the end 114 of the transfer segment 110 may additionally or alternatively include any other shape and/or extend in any other directions away from the base 84 that enables the heat pipe 88 to carry heat away from the base 84.

The heat pipes 88 may dissipate heat absorbed from the base 84 directly to the surrounding environment of the transceiver assembly 10. In addition or alternatively to directly dissipating heat to the surrounding environment of the transceiver assembly 10, the thermal transfer assembly 66a optionally includes the heat sink 68 (FIG. 1). Specifically, and referring now to FIG. 1, the heat sink 68 is mounted to the heat pipes 88 such that the heat sink 68 is connected in thermal communication with the transfer segments 110 of the heat pipes 88. The heat sink 68 is configured to absorb heat from the transfer segments 110 of the heat pipes 88 and dissipate the heat absorbed from the heat pipes 88 to the surrounding environment of the transceiver assembly 10.

In some alternative embodiments, the thermal transfer assembly 66a does not include the heat pipes 88, and the heat sink 68 is connected in thermal communication with the edge 94a (FIGS. 4-6) of the base 84 (FIGS. 4-7), for example through one or more openings (not shown) that extend through the side wall 56 of the cage 36.

The function of the thermal transfer assembly 66b to absorb and dissipate heat from the pluggable module 12d that is received within the port 44d is substantially similar to the function of the thermal transfer assembly 66a for dissipating heat from the pluggable module 12b. The function of the thermal transfer assembly 66b will therefore not be described in more detail herein. Moreover, although the thermal transfer assemblies 66a and 66b are discrete components of the transceiver assembly 10 in the illustrated embodiment, in some alternative embodiments the thermal transfer assemblies 66a and 66b define a single, continuous thermal transfer assembly that is configured to dissipate heat from both of the pluggable modules 12b and 12d.

The embodiments described and/or illustrated herein may provide a transceiver assembly that facilitates preventing one or more pluggable modules of the transceiver assembly from overheating.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A receptacle assembly comprising:
a cage comprising an interior cavity and a divider that divides the interior cavity into first and second ports, the cage having a front end that is open to the first and second ports, the first and second ports configured to receive first and second pluggable modules, respectively, therein through the front end, the divider comprising an internal compartment that extends between the first and second ports, the divider including a first wall that defines a division between the first port and the internal compartment and a second wall that defines a division between the second port and the internal compartment, the first wall comprising an opening extending therethrough; and
a thermal transfer assembly comprising a base and a spring, the base being received within the internal compartment of the divider and comprising a module side that faces the first port, the module side engaging the first wall and entirely covering the opening, the module side comprising a platform that extends into the opening of the first wall of the divider, the platform having a module surface at which the base is configured to thermally communicate with the first pluggable module, the spring being operatively connected between the second wall of the divider and the base such that the spring is configured to bias the base toward the first port and thereby press the module surface of the platform into physical contact with the first pluggable module in the first port, the second wall extending between the thermal transfer assembly and the second pluggable module in the second port such that the thermal transfer assembly does not engage in physical contact with the second pluggable module.

2. The receptacle assembly of claim 1, wherein the thermal transfer assembly further comprises a heat pipe, the heat pipe comprising a base segment that extends from, and is in thermal communication with, the base, the heat pipe comprising a transfer segment that extends away from the base segment for carrying heat away from the base.

3. The receptacle assembly of claim 1, wherein the thermal transfer assembly further comprises a heat pipe that is in thermal communication with the base, the thermal transfer assembly further comprising a heat sink connected in thermal communication with the heat pipe for dissipating heat from the heat pipe.

4. The receptacle assembly of claim 1, wherein the base comprises a spring side that is opposite the module side, the thermal transfer assembly further comprising a top that extends within the internal compartment of the divider between the base and the second wall of the divider, the spring being engaged in physical contact between the top and the spring side of the base such that the spring is operatively connected between the divider and the base for biasing the base toward the first port.

5. The receptacle assembly of claim 1, wherein the thermal transfer assembly further comprises a heat pipe having a base segment that is in thermal communication with the base and a transfer segment that extends away from the base segment for carrying heat away from the base, the cage comprising a side wall that defines a boundary of the internal compartment of the divider, the side wall comprising an opening, the heat pipe extending outward from the base through the opening and along the side wall.

6. The receptacle assembly of claim 1, wherein the thermal transfer assembly further comprises a heat pipe having a base segment that is in thermal communication with the base and a transfer segment that extends away from the base segment for carrying heat away from the base, the base of the thermal transfer assembly comprising an opening that extends into the base, the base segment of the heat pipe being received within the opening of the base to connect the base segment of the heat pipe in thermal communication with the base.

7. The receptacle assembly of claim 1, further comprising a heat sink mounted to the cage, the heat sink being configured to thermally communicate with the second pluggable module when the second pluggable module is received within the second port for dissipating heat from the second pluggable module.

8. The receptacle assembly of claim 1, wherein the divider comprises a front wall, the first wall, and the second wall, the first and second walls being spaced apart from each other to define the internal compartment of the divider therebetween, the front wall extending from the first wall to the second wall at the front end of the cage.

9. The receptacle assembly of claim 1, wherein the cage is configured to be mounted to a circuit board, the first and second ports being arranged in a column wherein the first and second ports are lower and upper ports, respectively, with the lower port being arranged below the upper port in the column such that the lower port is configured to extend between the circuit board and the upper port.

10. The receptacle assembly of claim 1, wherein the platform protrudes from the module side of the base, wherein a portion of the module side of the base surrounding the platform does not extend through the opening of the first wall.

11. The receptacle assembly of claim 1, wherein the module surface of the platform has a greater surface area than a surface area of a portion of the module side of the base that surrounds the platform.

12. A receptacle assembly for mating with first and second pluggable modules, the receptacle assembly comprising:
a cage comprising an interior cavity and a divider that divides the interior cavity into lower and upper ports, the cage having a front end that is open to the lower and upper ports, the lower and upper ports configured to receive the first and second pluggable modules, respectively, therein through the front end, the divider comprising an internal compartment that extends between the lower and upper ports, the divider comprising an upper wall that defines a division between the upper port and the internal compartment and a lower wall that defines a division between the lower port and the internal compartment, the lower wall defining an opening extending therethrough;
first and second receptacle connectors held within the lower and upper ports, respectively, for mating with the first and second pluggable modules, respectively; and
a thermal transfer assembly comprising a base, a top, a spring, and a heat pipe, the base being received within the internal compartment of the divider, the base comprising a module side that faces the lower port and a spring side that is opposite the module side, the module side of the base engaging the lower wall and entirely covering the opening, the module side comprising a platform, the top extending within the internal compartment between the base and the upper wall of the divider, the spring being engaged in physical contact between the top and the spring side of the base, the spring pressing the top into physical engagement with the upper wall and pressing the base toward the lower port such that the platform extends into the opening of the lower wall and a module surface of the platform engages in physical contact with the first pluggable module in the lower port, the upper wall extending between the thermal transfer assembly and the second pluggable module in the upper port such that the thermal transfer assembly does not engage in physical contact with the second pluggable module, the heat pipe comprising a base segment that is connected in thermal communication with the base, the heat pipe comprising a transfer segment that extends away from the base segment for carrying heat away from the base.

13. The receptacle assembly of claim 12, further comprising a heat sink connected in thermal communication with the transfer segment of the heat pipe for dissipating heat from the transfer segment.

14. The receptacle assembly of claim 12, wherein the cage comprises a side wall that defines a boundary of the internal compartment of the divider, the side wall comprising an opening, the heat pipe extending outward from the base through the opening and along the side wall.

15. The receptacle assembly of claim 12, further comprising a heat sink mounted to the cage, the heat sink being configured to thermally communicate with the second pluggable module when the second pluggable module is received within the upper port for dissipating heat from the second pluggable module.

16. The receptacle assembly of claim 12, wherein the base segment of the heat pipe is an end of the heat pipe.

17. A receptacle assembly comprising:

a cage comprising an interior cavity and a divider that divides the interior cavity into at least two ports, the cage having a front end that is open to the ports, the divider including a first wall and a second wall and defining an internal compartment between the first and second walls, the first wall defining a division between a first port of the at least two ports and the internal compartment, the second wall defining a division between the internal compartment and a second port of the at least two ports, the first wall defining an opening extending therethrough; and a thermal transfer assembly comprising a base, a spring, and a heat pipe, the base being received within the internal compartment of the divider and comprising a module side, the module side engaging the first wall and entirely covering the opening, the base including a platform protruding from the module side through the opening of the first wall into the first port, the platform having a module surface at which the base is configured to thermally communicate with a first pluggable module in the first port, the spring being operatively connected between the second wall of the divider and the base in the internal compartment such that the spring is configured to bias the base toward the first port and thereby press the module surface of the platform into physical contact with the first pluggable module in the first port, the second wall extending between the thermal transfer assembly and the second port such that the thermal transfer assembly does not engage in physical contact with a second pluggable module in the second port, the heat pipe comprising a base segment that is connected in thermal communication with the base, the heat pipe comprising a transfer segment that extends away from the base segment for carrying heat away from the base.

18. The receptacle assembly of claim 17, wherein the base comprises a spring side that is opposite the module side, the thermal transfer assembly further comprising a top that extends within the internal compartment of the divider between the base and the second wall of the divider, the spring being engaged in physical contact between the top and the spring side of the base to press the top into physical engagement with the second wall and press the base towards to the first port such that the platform extends through the opening of the first wall.

19. The receptacle assembly of claim 17, further comprising a heat sink mounted to the cage, the heat sink being configured to thermally communicate with the second pluggable module in the second port for dissipating heat from the second pluggable module.

* * * * *